(12) United States Patent
Cheng

(10) Patent No.: US 6,767,027 B2
(45) Date of Patent: Jul. 27, 2004

(54) FOLDING STRUCTURE FOR BASKET SUPPORT OF A STROLLER

(76) Inventor: Pao-Hsien Cheng, No. 139, Jen Yi 1st Street, Jen Te Hsiang, Tainan Hsien (TW)

( * ) Notice: Subject to any disclaimer, the term of this patent is extended or adjusted under 35 U.S.C. 154(b) by 0 days.

(21) Appl. No.: 10/229,097

(22) Filed: Aug. 28, 2002

(65) Prior Publication Data

US 2004/0041368 A1 Mar. 4, 2004

(51) Int. Cl.[7] .................................................. B62B 1/00
(52) U.S. Cl. ...................................................... 280/642
(58) Field of Search ................................ 280/642, 643, 280/647, 648, 649, 650, 657, 658, 47.38, 47.4, 62; D12/129

(56) References Cited

U.S. PATENT DOCUMENTS

| | | | | |
|---|---|---|---|---|
| D266,236 S | * | 9/1982 | Nakao et al. ............... | D12/129 |
| RE31,760 E | * | 12/1984 | Kassai ........................ | 280/644 |
| 4,923,208 A | * | 5/1990 | Takahashi et al. .......... | 280/642 |
| 5,660,435 A | * | 8/1997 | Eichhorn .................... | 297/219.12 |
| 5,893,577 A | * | 4/1999 | Takahashi ................... | 280/642 |
| 5,938,230 A | * | 8/1999 | Huang et al. ............... | 280/650 |
| 6,416,076 B1 | * | 7/2002 | Hou et al. ................... | 280/642 |
| 6,520,598 B1 | * | 2/2003 | Cheng ....................... | 301/111.01 |
| 2002/0093178 A1 | * | 7/2002 | Turner et al. ............... | 280/650 |
| 2003/0094791 A1 | * | 5/2003 | Hartenstine et al. ........ | 280/642 |

* cited by examiner

Primary Examiner—Bryan Fischmann
(74) Attorney, Agent, or Firm—Rosenberg, Klein & Lee

(57) ABSTRACT

A basket support is provided to a foldable stroller. The basket support includes two connecting blocks, two rods, and a pivotal element. The rods are pivoted to respective connecting blocks at outer ends, and the pivotal element at inner ends. The rods are moved closely together with each other when the stroller is folded for storage and transportation. The connecting blocks are detachably fitted to corresponding rear extensions of a seat support. When folded, the basket support together with two rear wheels can support the stroller in an upright folded position. The basket support and the rear wheels are detachable from the frame of the stroller to be placed where spare space results in a packing case for optimal space utility in storage.

6 Claims, 7 Drawing Sheets

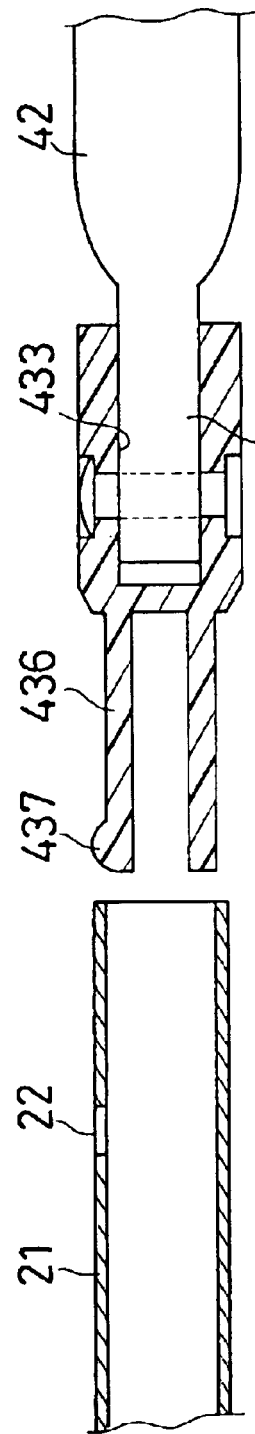
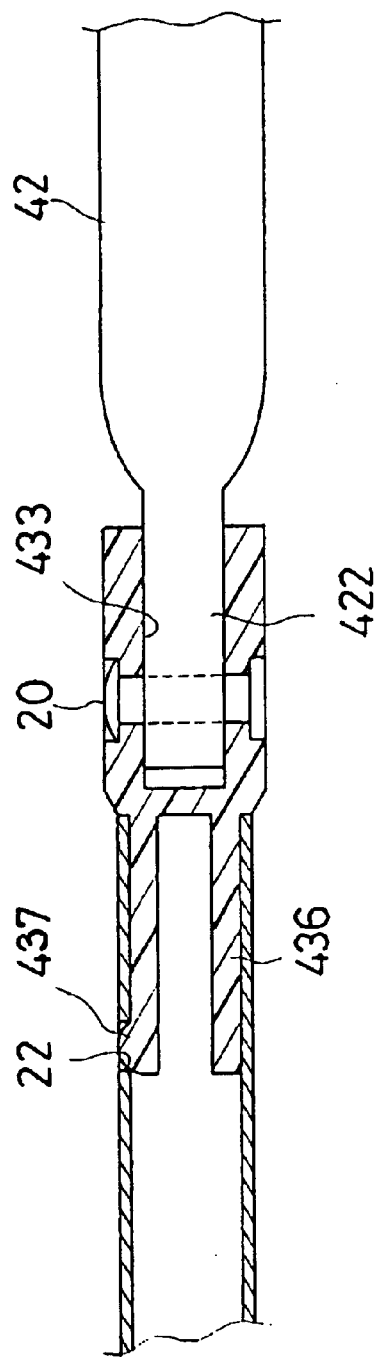

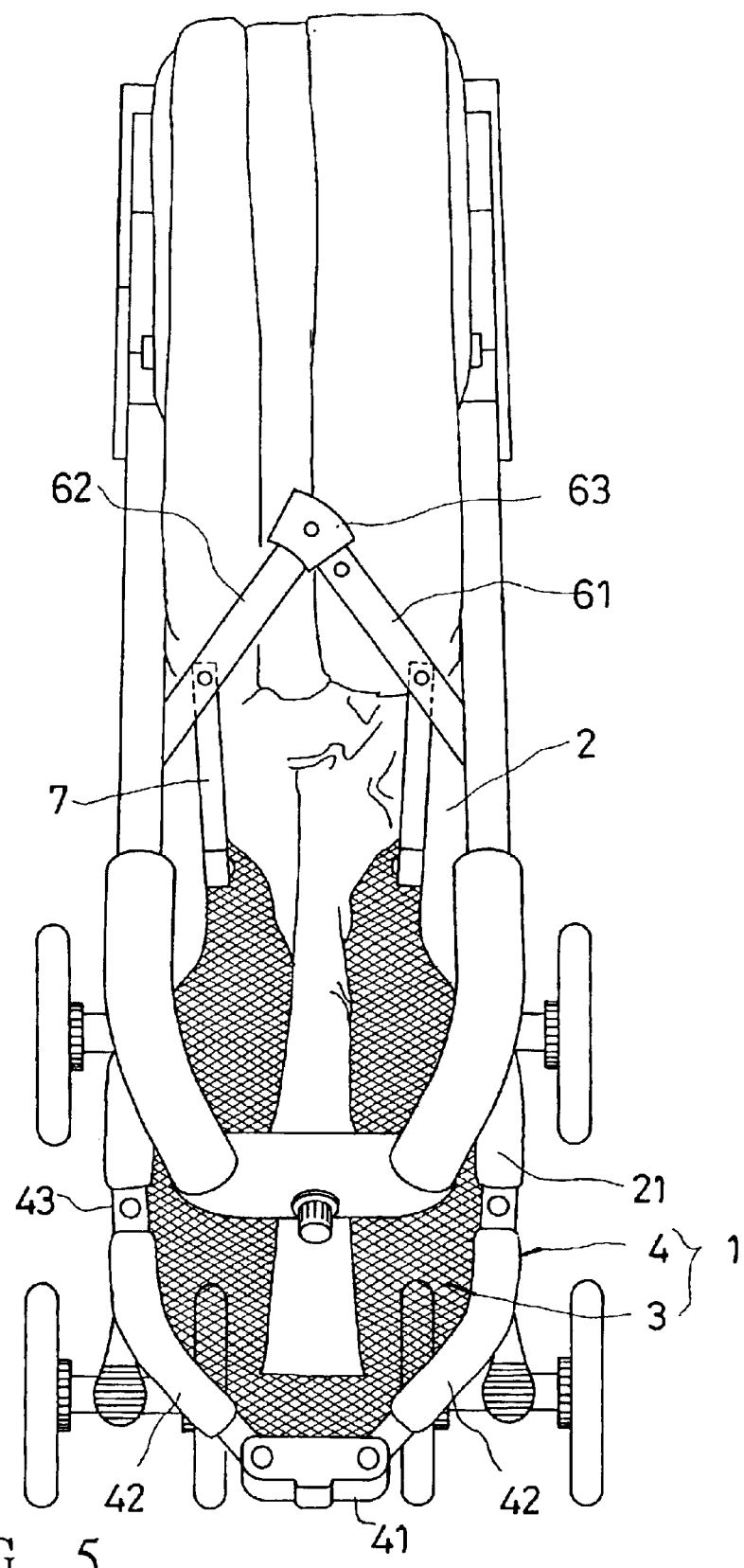
F I G. 5

US 6,767,027 B2

FOLDING STRUCTURE FOR BASKET SUPPORT OF A STROLLER

BACKGROUND OF THE INVENTION

1. Field of the Invention

The present invention relates to a basket support of a stroller, more particularly a stroller basket support, which can be used to support the stroller in upright position together with the rear wheels when the stroller is folded, and which can be detached from the stroller frame for compactness when the stroller is in a folded configuration.

2. Brief Description of the Prior Art

Foldable strollers are very popular because they can be collapsed to a smaller size for easy storage and transportation. The present applicant has disclosed several foldable strollers that are equipped with detachable wheels in patent applications. Such strollers are even more convenient to use because size thereof is significantly reduced when the wheels are detached from the main frame.

However, in strollers disclosed by the present applicant, no attention was paid to improving the basket so that the basket will not hinder the folding action of the strollers. In some of the strollers, no baskets are provided, while in others, the baskets are made to be relatively small in size to avoid interference with folding of the strollers. Consequently, convenience of the strolers' use is reduced.

SUMMARY OF THE INVENTION

It is a main object of the present invention to provide a stroller basket support, which can be detached from the stroller frame for allowing reduction of dimensions of the stroller in the folded position.

It is another object of the present invention to provide a stroller basket support, which can be used to support the stroller in upright position together with the rear wheels when the stroller is folded.

The basket support includes two rods and a pivotal element. The rods are each pivoted to a connecting block at an outer end, and one end of the pivotal element at an inner end. The rods are pivoted on the pivotal element to be closely disposed when the stroller is folded for storage and transportation. The connecting blocks are detachably fitted to corresponding rear extensions of a seat support of the stroller.

BRIEF DESCRIPTION OF THE DRAWINGS

The present invention will be better understood by reference to the accompanying drawings, wherein:

FIG. 2 is a partial cross-sectional view of the stroller basket support of the present invention.

FIG. 3 is another partial cross-sectional view of the stroller basket support of the present invention.

FIG. 5 is a rear view of the stroller with the basket support of the present invention.

DETAILED DESCRIPTION OF THE PREFERRED EMBODIMENTS

Figure 1:
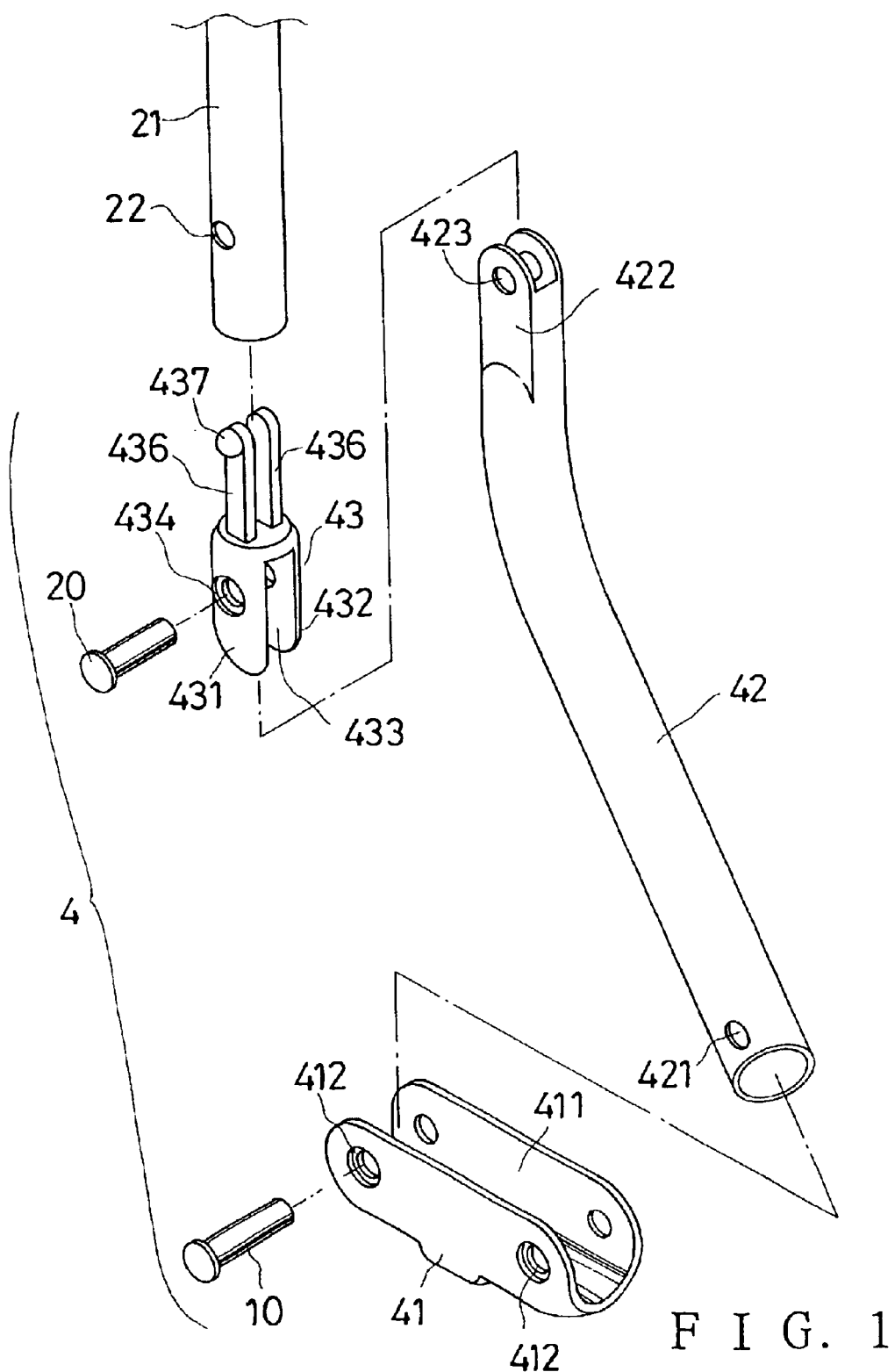
FIG. 1 is a fragmentary exploded perspective view of the stroller basket support of the present invention.
Figure 4:
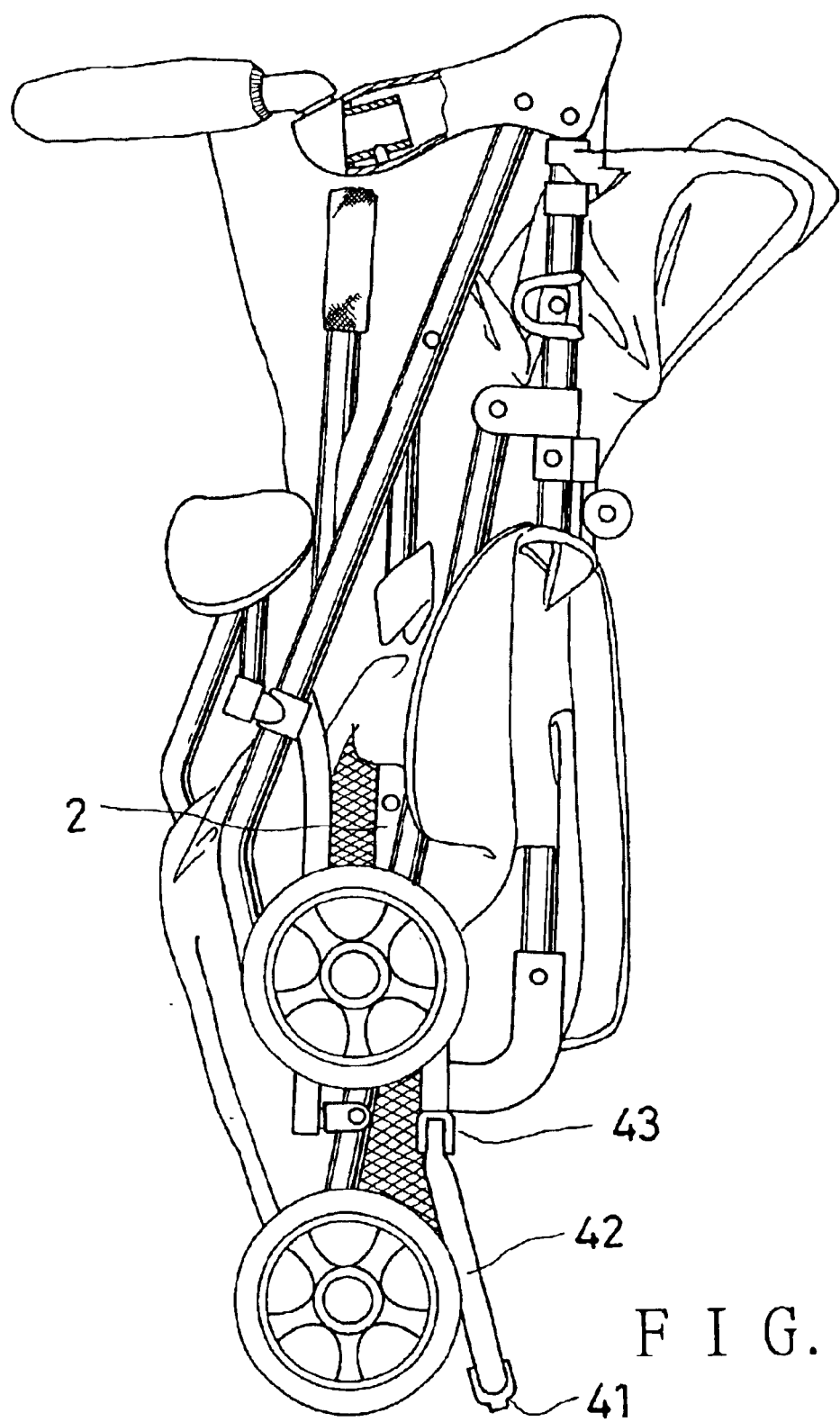
FIG. 4 is a side view of the stroller with the basket support of the present invention.

Referring to FIGS. 1, 2, 4, and 5, a basket support 4 of a stroller of the present invention includes a pivotal element 41, two main rods 42, 42, and two connecting blocks 43, 43.

Each of the connecting blocks 43 has two spaced-apart plates 431, 432 at one end, and two spaced-apart resilient plates 436, 436 at the other end. A gap 433 is formed between the plates 431, 432. Through holes 434 are formed on the plates 431, 432. At least one of the resilient plates 436 is formed with protrusions 437 on outer sides thereof. In addition, each of the spaced-apart plates 431, 432 has a flat inward side (not numbered).

The pivotal element 41 has a first plate section, and two spaced-apart second plate sections joined to opposing edges of the first plate section to form a room 411 in between. Aligned through holes 412, 412 are formed on two ends of both of the second plate sections of the pivotal element 41.

Each of the main rods 42 has opposing flat sections 422 on outer sides of a first end thereof, and has through holes 423 on the first end. Each of the main rods 42 further has through holes 421 on the second end opposite to the first end.

In combination, the second ends of the main rods 42 are positioned in the room 411, and pivotal rods 10 are passed through the holes 412 of the pivotal element 41 as well as the holes 421 of the main rods 42. Each of the first ends of the main rods 42 are positioned in the gap 433 of corresponding connecting block 43 with the flat sections 422 facing the inward flat sides of the plates 431, 432, and with pivotal rods 20 being passed through the holes 434 of the connecting block 43 as well as the holes 423 so that the main rods 42 pivot on corresponding connecting blocks 43. A basket 3 is joined to the basket support 4 to form a basket structure 1 for receiving objects therein.

To fit the basket support 4 to a stroller, each of the connecting blocks 43 is joined to a corresponding hollow rear extension 21 formed on of a seat support 2 of the stroller with the resilient plates 436 thereof being inserted into the hollow rear extension 21, and with the protrusions 437 of the resilient plates 436 being fitted into lateral through holes 22 of the rear extension 21. Thus, the basket support 4 is detachably fitted to the rear extensions 21 of the seat support of the stroller.

Figure 6:
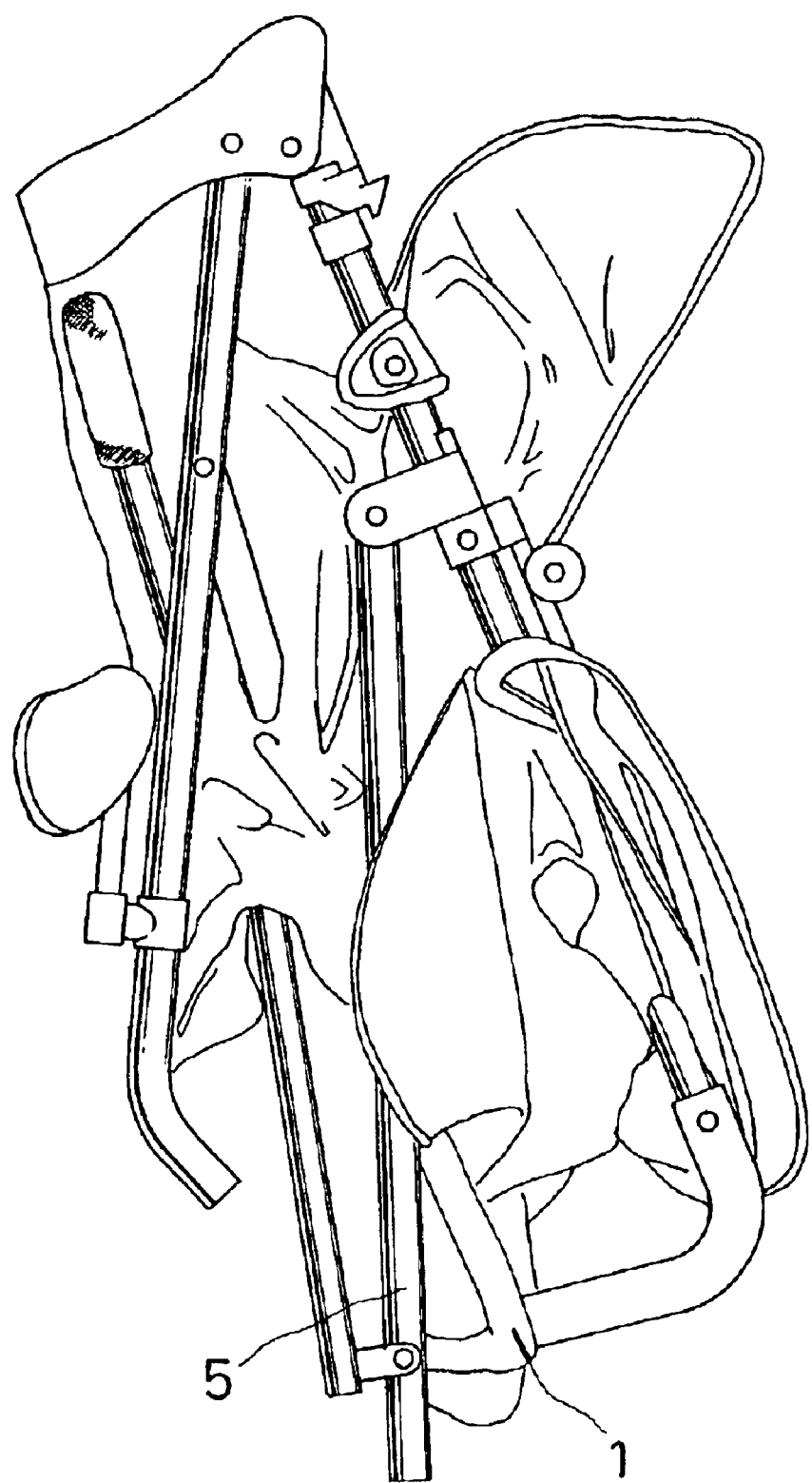
FIG. 6 is a side view of the stroller according to the present invention.
Figure 7:
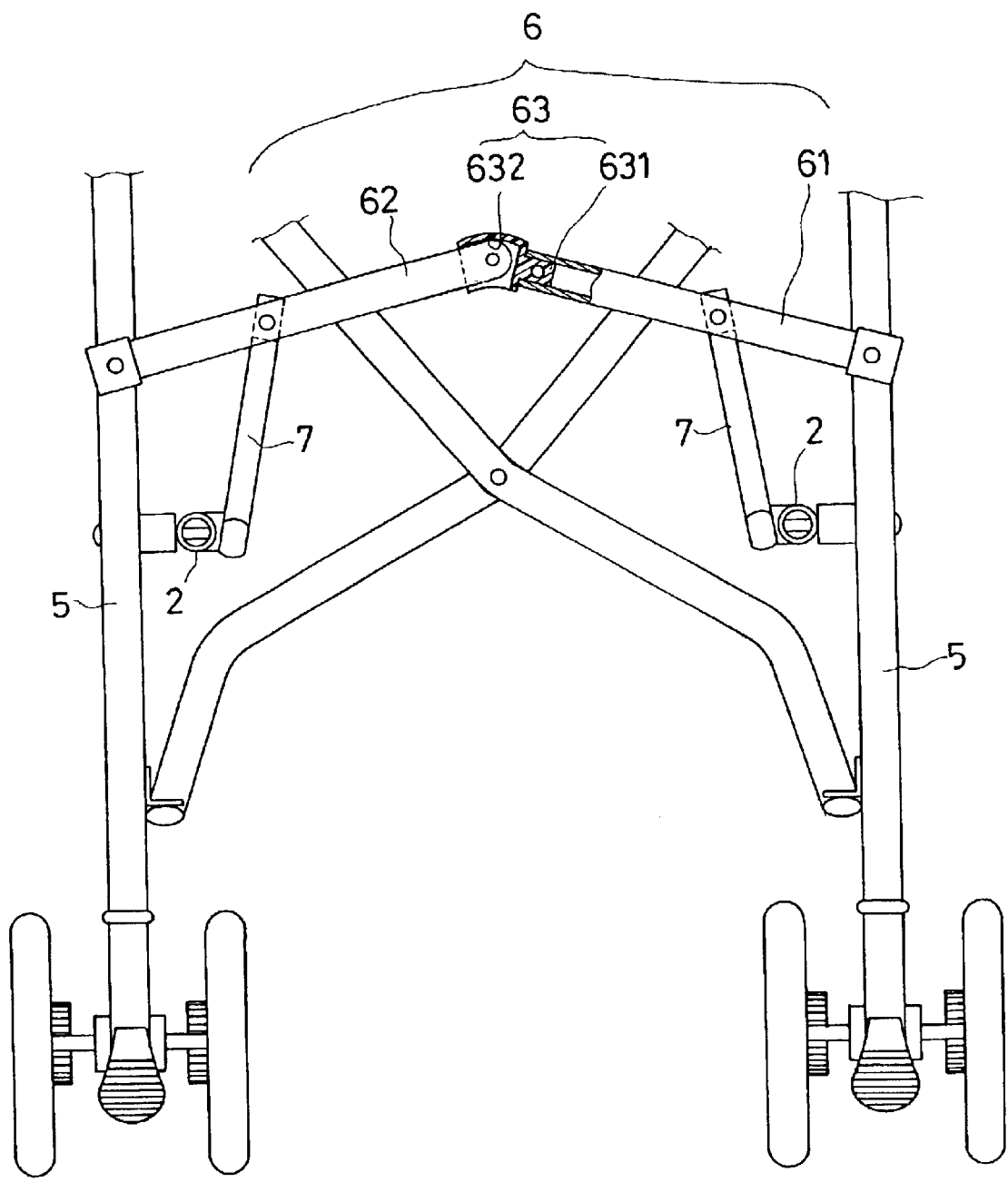
FIG. 7 is a partial rear view of the stroller according to the present invention.
Figure 8:
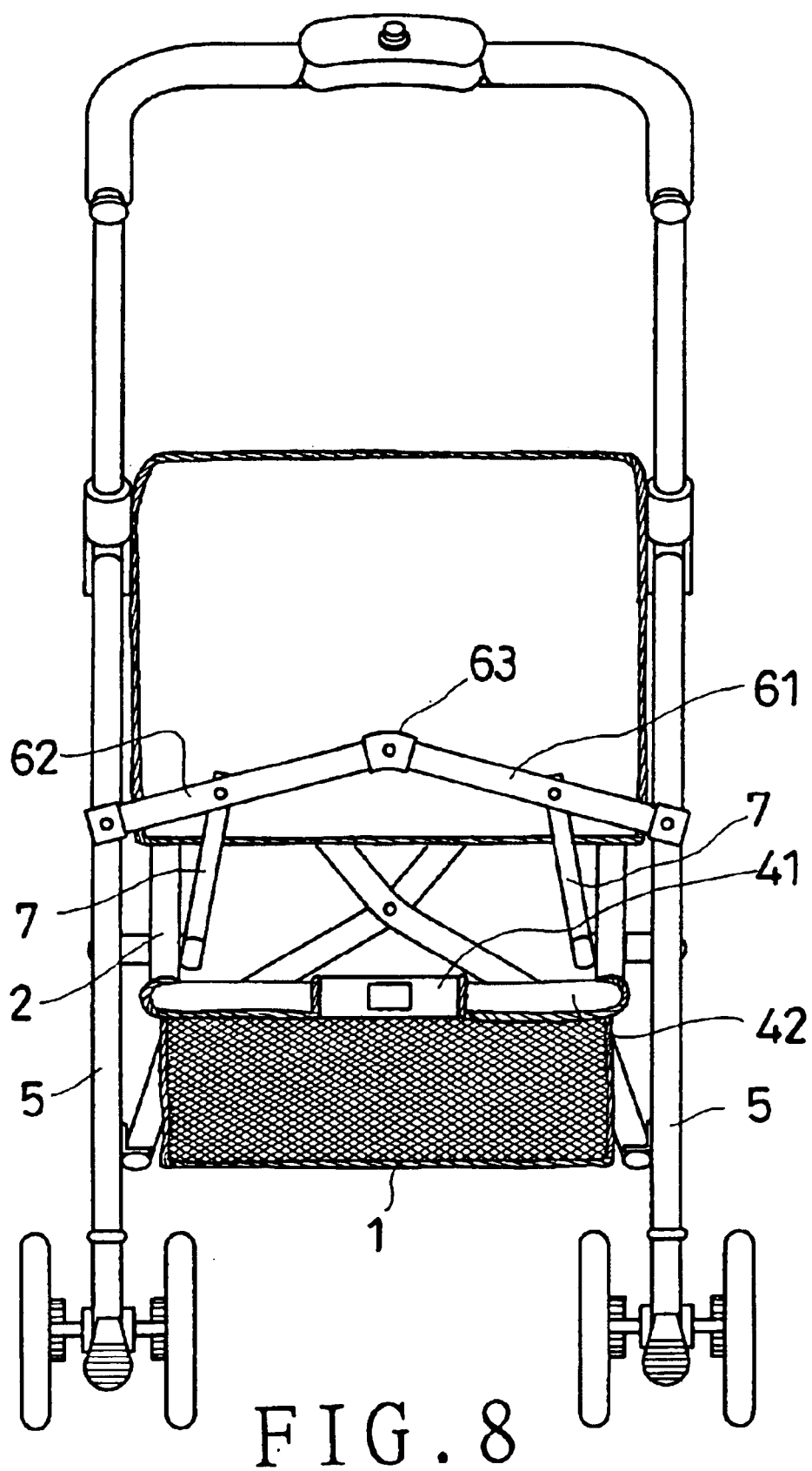
FIG. 8 is a rear view of the stroller according to the present invention, in an unfolded configuration.

Furthermore, referring to FIGS. 5, 7, and 8, a first co-moving rod combination 6, and a second co-moving rod combination (including the co-moving rods 7,7) are provided for effecting movement of the basket support 4 in folding a frame of the stroller. The first rod combination 6 has co-moving rods 61, 62, and a connecting element 63, while the second rod combination has two co-moving rods 7, 7. The co-moving rods 61, 62 are pivoted to respective ones of rear portions 5 of the stroller frame at outer ends thereof. The connecting element 63 is fixedly joined to an inner end of the co-moving rod 61 at one end with a fixing pin 631. The connecting element 63 has a holding portion 632 at another end. The co-moving rod 62 is received in, and pivoted to the holding portion 632 so that pivotal connection is formed on both of the co-moving rods 61, 62. The rods 7, 7 are pivoted to the rear extensions 21 at first ends, and pivoted to corresponding respective co-moving rods 61, 62 at other ends. In addition, the rods 7, 7 may be pivoted to each other at intermediate portions thereof Referring to FIGS. 4 and 5, when the frame of the stroller is folded, the basket support 4 (referenced in FIG. 5) is folded, too. And, the basket support 4 together with two rear wheels can support the folded stroller in upright position. Referring to FIG. 6, the basket support 4 (referenced in FIG. 5) and the rear wheels are detached from the frame of the stroller, and placed where spare space results in a packing case for optimal space utility when the stroller is to be stored or transported.

From the above description, it can be easily seen that the present basket support provides the following advantages:

1. Because the basket support is foldable, it may be formed with greater dimensions before it will hinder folding of the stroller.
2. When the stroller is folded, the basket support can support the stroller in upright position together with two rear wheels.
3. The basket support and the rear wheels can be detached from the frame, and placed where spare space results in a packing case for optimal space utility during storage or transport.
4. When the stroller frame is being folded, the basket support can be folded conveniently and smoothly, as enabled by the first and the second co-moving rod combinations.

What is claimed is:

1. A foldable basket assembly for a stroller comprising:
   a basket support for hanging a basket thereon; the basket support being detachably joined respectively to at least two rear extensions disposed to extend from a seat support of a stroller at two ends thereof; the basket support being foldable responsive to a main frame of the stroller being folded; the basket support including a pair of main rods and a pivotal element pivotally coupled to the main rods to extend therebetween, the pivotal element being disposed to supportingly maintain a portion of the stroller in an upright position when the stroller is folded to a collapsed configuration.

2. A folding structure for a basket support of a stroller, the basket support being provided for hanging a basket thereon; the basket support being detachably joined to ends of two respective rear extensions formed on a seat support of a stroller; the basket support being capable of being folded when a main frame of the stroller is folded; the basket support being made in such a manner as to be capable of supporting the stroller in an upright position together with two rear wheels of the stroller when the stroller is folded, wherein the basket support comprises:
   two connecting blocks each having a first end portion, and an opposite second end portion including two spaced-apart resilient plates; at least one of the resilient plates having protrusions on outer sides;
   two main rods each pivoted on the first end portion of a corresponding connecting block at a first end; the main rods each having a second end opposite to the first end thereof; and,
   a pivotal element having two end portions;
   the main rods being each pivoted to a corresponding end portion of the pivotal element at the second end thereof for allowing the basket support to be folded into a reduced size together with the main frame of the stroller;
   the connecting blocks being each detachably joined to a corresponding rear extension of the seat support of the stroller with the resilient plates being inserted into the rear extension, and with the protrusions of the resilient plates being fitted into lateral through holes of the rear extension.

3. A folding structure for a basket support of a stroller as claimed in claim 2, wherein the pivotal element has a first plate section, and two spaced-apart second plate sections are joined to opposing edges of the first plate section; the second ends of the main rods being positioned between the second plate sections in pivotal connection of the main rods to the pivotal element.

4. A folding structure for a basket support of a stroller as claimed in claim 3, wherein each first end portion of the connecting blocks has two spaced-apart plates having flat inward sides, each first end of the main rods having flat sections on outer sides; the first ends of the main rods being positioned between the plates of the first end portions of corresponding connecting blocks with the flat sections facing the flat inward sides.

5. A folding structure for a basket support of a stroller, the basket support being provided for hanging a basket thereon; the basket support being detachably joined to ends of two respective rear extensions formed on a seat support of a stroller; the basket support being capable of being folded when a main frame of the stroller is folded; the basket support being made in such a manner as to be capable of supporting the stroller in an upright position together with two rear wheels of the stroller when the stroller is folded, wherein two first co-moving rods, and two second co-moving rods are provided for effecting movement of the basket support in folding a frame of the stroller; the first co-moving rods being pivoted at outer ends thereof to respective rear portions of the frame, and pivoted to each other at inner ends thereof; the second co-moving rods being pivoted at first ends to the rear extensions of the seat support, and pivoted to corresponding first co-moving rods at other ends.

6. A folding structure for a basket support of a stroller as claimed in claim 5 further comprising a connecting element; the connecting element being fixedly joined at one end to one of the first co-moving rods, and having a holding portion at another end; the other of the first co-moving rods being received in, and pivoted to the holding portion for pivotal connection of both of the first co-moving rods.

* * * * *